(12) United States Patent
Ota

(10) Patent No.: US 7,546,283 B2
(45) Date of Patent: Jun. 9, 2009

(54) NETWORKED PERSONAL VIDEO RECORDER WITH SHARED RESOURCE AND DISTRIBUTED CONTENT

(75) Inventor: Takaaki Ota, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 424 days.

(21) Appl. No.: 11/204,846

(22) Filed: Aug. 15, 2005

(65) Prior Publication Data

US 2007/0039033 A1     Feb. 15, 2007

(51) Int. Cl.
*G06F 17/30* (2006.01)
(52) U.S. Cl. .............................. 707/1; 709/220; 725/105
(58) Field of Classification Search ................. 707/100, 707/104.1, 1, 10; 725/105; 709/220
See application file for complete search history.

(56) References Cited

U.S. PATENT DOCUMENTS

| | | | |
|---|---|---|---|
| 7,055,167 B1 * | 5/2006 | Masters | 725/39 |
| 7,114,172 B2 * | 9/2006 | Lord | 725/80 |
| 7,293,276 B2 * | 11/2007 | Phillips et al. | 725/42 |
| 7,484,015 B2 * | 1/2009 | Kim et al. | 710/16 |

* cited by examiner

*Primary Examiner*—Cheryl Lewis
(74) *Attorney, Agent, or Firm*—Haverstock & Owens LLP (57) ABSTRACT

A networked personal video recorder with shared resource and distributed content is provided. In one example, a method is provided for managing personal video recorders in a network. The method includes receiving a user defined recording task, recognizing each personal video recorder in the network as a collaborative peer, tracking statistical information on each personal video recorder, and delegating an appropriate personal video recorder to record the user defined recording task.

17 Claims, 6 Drawing Sheets

NETWORKED PERSONAL VIDEO RECORDER WITH SHARED RESOURCE AND DISTRIBUTED CONTENT

FIELD OF THE INVENTION

The present invention relates to personal video recorders. More particularly, the present invention relates to personal video recorders managed over a network.

BACKGROUND OF THE INVENTION

A personal video recorder (PVR) is a generic term for a device that is similar to a videocassette recorder (VCR) but records television data in digital format as opposed to the VCR's analog format. Conventional PVRs encode video data in MPEG-1 or MPEG-2 formats, standards set by Moving Picture Experts Group (MPEG), and store the data in a hard drive. PVRs have all of the same functionality of VCRs (recording, playback, fast forwarding, rewinding, pausing) plus the ability to instantly jump to any part of the program without having to rewind or fast forward the data stream.

A PVR is also referred to as a hard disk recorder (HDR), digital video recorder (DVR), personal video station (PVS), or a personal TV receiver (PTR). Two common PVR systems are TiVo® and ReplayTV®.

A PVR chooses programs based on explicit user requests or some intelligent algorithm that conjectures the user's preferences. The PVR then records the programs onto the hard disk drive. The user has the ability to watch any of the recorded programs at his convenience. The user has the ability to view a program simultaneously while the PVR records another program. Some PVRs even allow another viewer to watch yet another recorded program via network connection.

Unfortunately, one major restriction of a conventional PVR is that only one program can be recorded simultaneously. This restriction comes from the fact that the PVR has only one tuner. It is possible to add more tuners to the PVR. However, doing so significantly increases the cost of the PVR.

Conventional PVR devices are setup to handle the recording of programs in an independent way. If a user wants to record multiple programs, the user must instruct each PVR to record a single program.

SUMMARY OF THE INVENTION

What is needed is an improved system having features for addressing the problems mentioned above and new features not yet discussed. Broadly speaking, the networked personal video recorder fills these needs by providing a networked personal video recorder with shared resource and distributed content. It should be appreciated that the networked personal video recorder is implemented in numerous ways, including as a method, a process, an apparatus, a system or a device. Inventive embodiments are summarized below.

In one embodiment, a method of managing personal video recorders in a network is provided. The method comprises receiving a user defined recording task, recognizing each personal video recorder in the network as a collaborative peer, tracking statistical information on each personal video recorder, and delegating an appropriate personal video recorder to record the user defined recording task.

In another embodiment, a system for managing personal video recorders over a network is provided. The system comprises a first personal video recorder connected to the network, a second personal video recorder connected to the network, and a distributed database configured to track statistical information on the first personal video recorder and on the second personal video recorder.

In yet another embodiment, a personal video recorder configured to have a connection to another personal video recorder over a network is provided. The personal video recorder comprises a shared distributed database configured to track statistical information on the personal video recorder and on another personal video recorder.

In still another embodiment, a virtual personal video recorder configured to have a connection to a network including a plurality of personal video recorders is provided. The virtual personal video recorder comprises a personal video recorder menu having a look and feel of a menu of a single personal video recorder device, wherein the personal video recorder menu is an interface to resources of at least two personal video recorders in the network.

The invention encompasses other embodiments configured as set forth above and with other features and alternatives.

BRIEF DESCRIPTION OF THE DRAWINGS

The present invention will be readily understood by the following detailed description in conjunction with the accompanying drawings. To facilitate this description, like reference numerals designate like structural elements.

DETAILED DESCRIPTION OF THE PREFERRED EMBODIMENT(S)

A networked personal video recorder (PVR) with shared resource and distributed content is disclosed. Numerous specific details are set forth in order to provide a thorough understanding of the embodiments. It will be understood, however, by one skilled in the art, that the embodiments of the networked personal video recorder may be practiced with other specific details.

Figure 1:
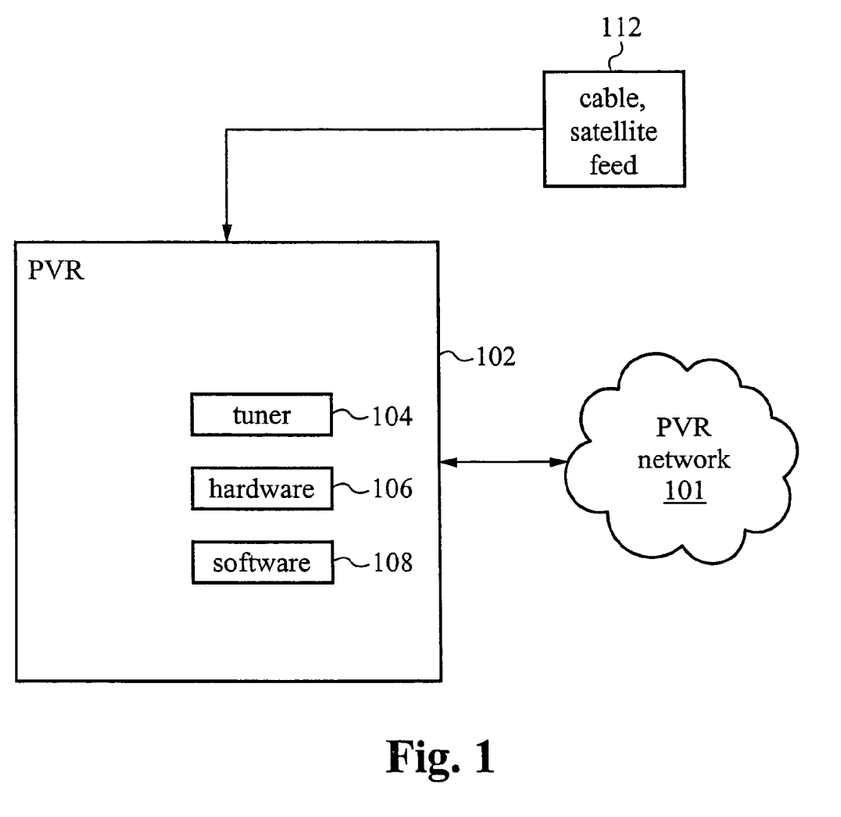
FIG. 1 shows a networked personal video recorder (PVR)

FIG. 1 shows a networked PVR 102. The networked PVR 102 includes but is not limited to a tuner 104, software 108 and other hardware 106. The other hardware 106 includes a hard disk drive, a power supply and communication and address buses. The software 108 is in the form of a subscription service that provides programming information and the ability to encode or decode data streams from a cable or satellite feed 112 or from other PVR devices in the PVR network 101. The networked PVR 102 is configured to receive an input signal from a cable/satellite feed 112 or from other PVR devices and to convert the input signal into viewable output for display on a television.

Each PVR in the PVR network 101 has associated resource usage information, including occupied time slots, free time slots, occupied disk space and free disk space. The occupied time slots are time slots in which the PVR is scheduled to record a program.

A user may want to record more than one program at a time. In such a case, the PVR system of the present invention involves performing time slot management in a collaborative manner amongst the PVR devices in the PVR network. In other words, a busy PVR utilizes the tuner and disk space of an idling PVR. Thus, the busy PVR can utilize more than its locally available resources.

Figure 2:
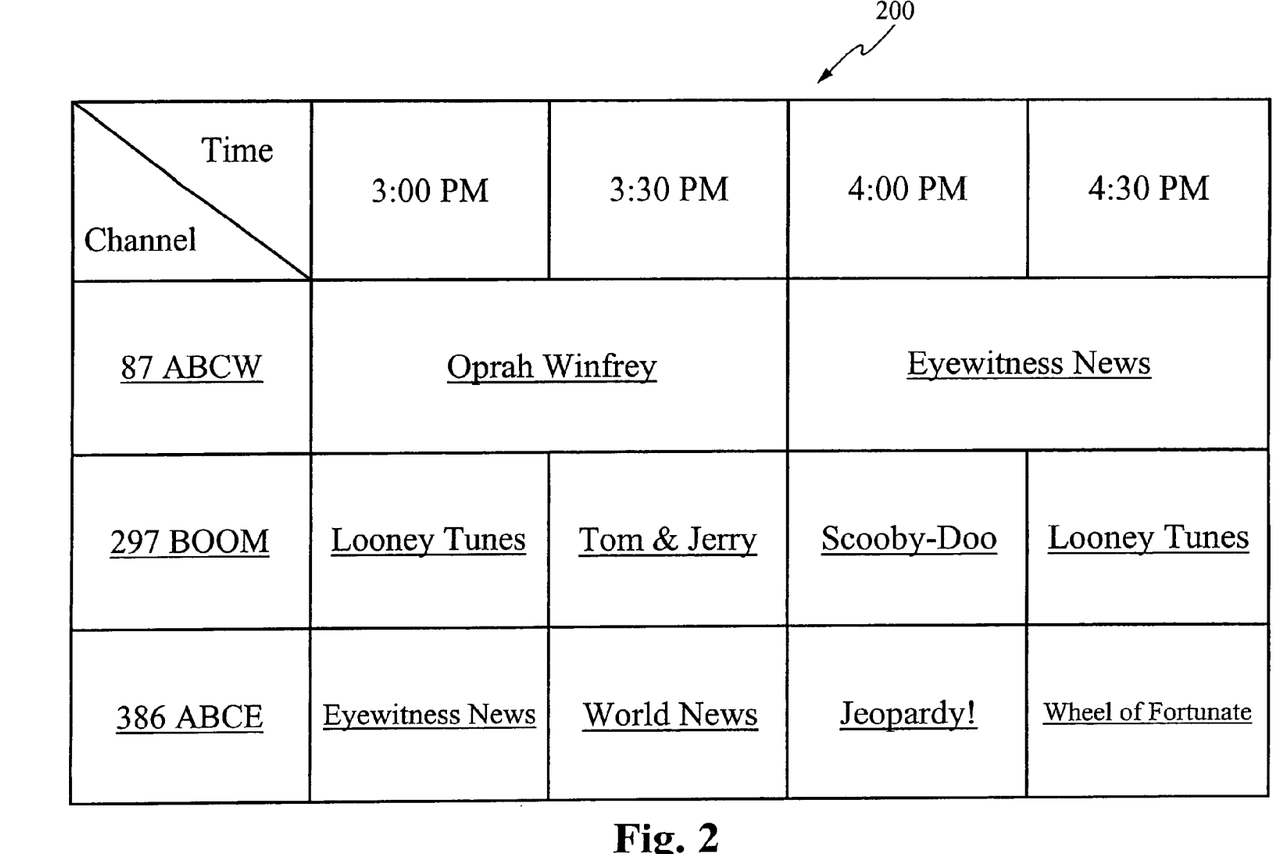
FIG. 2 illustrates an exemplary table of time slots for upcoming programs, in accordance with an embodiment.

FIG. 2 illustrates an exemplary table of time slots 200 for upcoming programs. As an example, a user may want to record World News at 3:30 pm on channel 386, as well as Oprah Winfrey at 3:00 pm on channel 87. In such a case, the time slots overlap because Oprah Winfrey runs from 3:00 pm to 4:00 pm, while World News runs from 3:30 pm to 4:00 pm. Typically, an individual PVR having one tuner would not be able to record both programs at the same time. However, the networked PVR utilizes a PVR network to overcome limitations of an individual PVR having one tuner.

Figure 3:
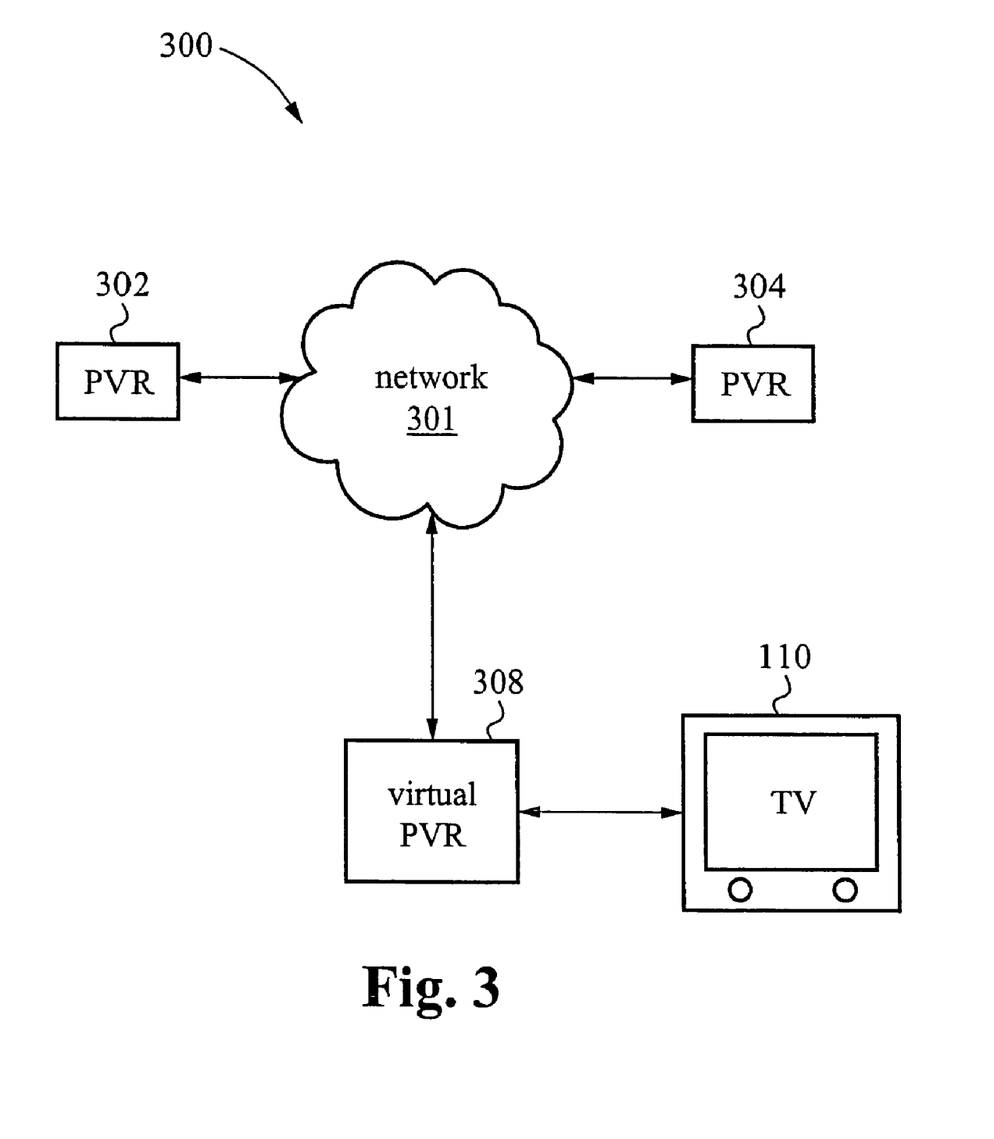
FIG. 3 illustrates a block diagram of a PVR system having a virtual PVR.

FIG. 3 illustrates a block diagram of a PVR system 300 having a virtual PVR 308. The PVR system 300 includes but is not limited to a first PVR 302, a network 301, a second PVR 304, and a virtual PVR 308. The PVR system 300 may include any number of PVR devices. However, this exemplary network shows two PVR devices for explanatory purposes.

The virtual PVR 308 is software, hardware or any combination thereof configured to combine all resources from each PVR in the PVR system 300. The virtual PVR 308 presents the combined resources to the user as one seamless PVR device. For example, the virtual PVR 308 outputs to the television 110 a virtual PVR menu having the look and feel of a single PVR device. However, the virtual PVR menu is actually a user interface to the resources of the combination of PVR devices, including the first PVR 302 and the second PVR 304.

In one embodiment of the PVR system 300, the virtual PVR 308 is a standalone device loaded with software configured to receive information from the first PVR 302 and the second PVR 304. The virtual PVR 308 is further configured with an instruction set for performing processing on the combination of information received from the PVR devices. The virtual PVR 308 issues instructions for outputting the virtual PVR menu onto the television 110. Through the virtual PVR menu, a user may interact with and manipulate features of the PVR system 300.

A networked PVR system distributes the resource usage information amongst the networked PVR devices. The PVR system thereby maximizes the whole system recording capability, which excels over the sum of individual capabilities. A user may add more PVR devices to the networked PVR system. By adding another PVR, the user view on the television 110 does not change. However, the capacity to record programs grows because the number of tuners increases and the overall storage space increases.

Figure 4:
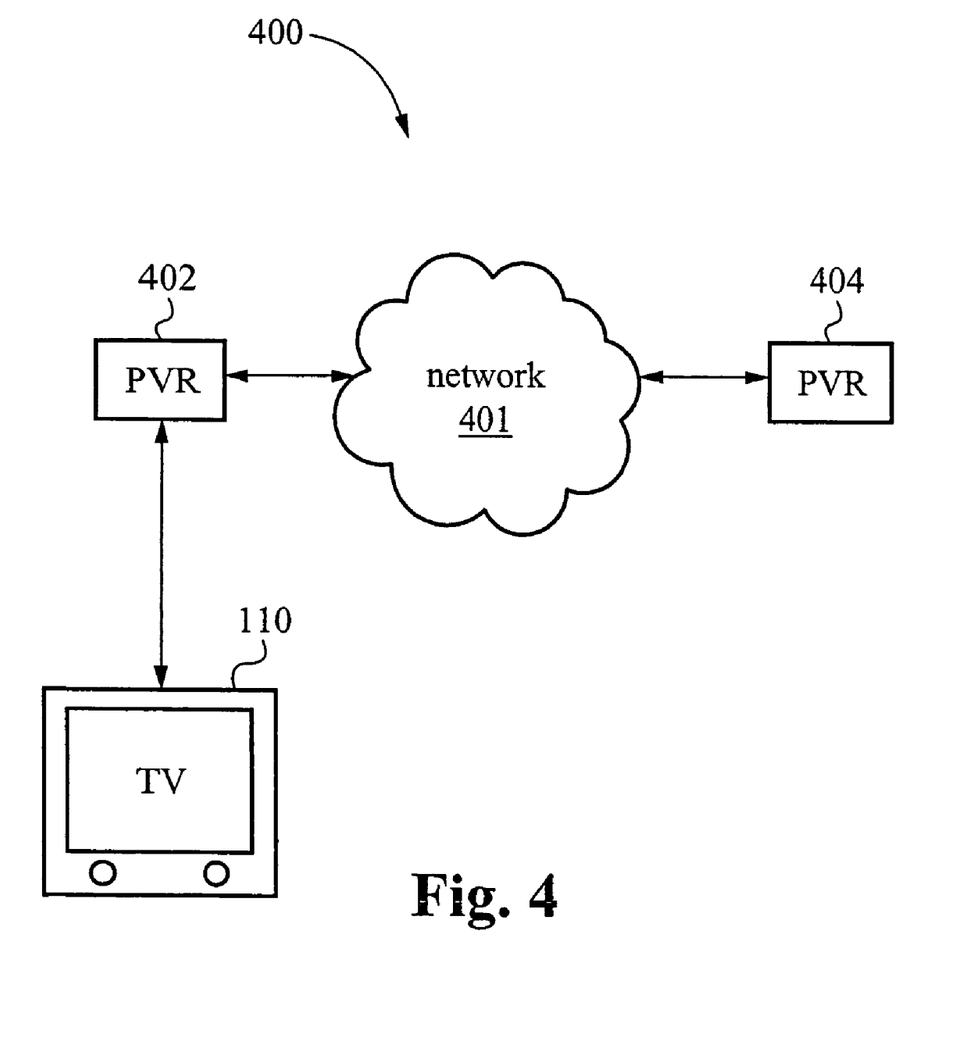
FIG. 4 shows a PVR system having a first PVR configured with implicitly sharing resources.

FIG. 4 shows a PVR system 400 having a first PVR 402 configured with implicitly sharing resources. The PVR system 400 includes but is not limited to a first PVR 402, a network 401 and a second PVR 404. The PVR system 400 may include any number of PVR devices. However, this exemplary network includes two PVR devices for explanatory purposes.

The first PVR 402 includes software, hardware or a combination thereof configured to perform similar tasks that the standalone virtual PVR 308 would perform. In the PVR system 400, each PVR device maintains its own content list and recording tasks. However, the resources are shared behind the scene such that one PVR's program is actually received and recorded on another PVR device. Consider the example discussed above with respect to FIG. 2. A user may want to record World News at 3:30 pm on channel 386, as well as Oprah Winfrey at 3:00 pm on channel 87. In such a case, the time slots overlap because Oprah Winfrey runs from 3:00 pm to 4:00 pm, while World News runs from 3:30 pm to 4:00 pm. The first PVR 402 would not be able to perform this recording task if the first PVR 402 has only one tuner. However, in the networked PVR system 400, the resources are shared behind the scene. Accordingly, the first PVR 402 has the ability to shift some of the recording tasks to the second PVR 404 or another PVR device of the PVR system 400.

The implementation of a networked PVR system involves an authentication technique of recognizing each PVR as a collaborative peer. The implementation also utilizes a distributed database technique that is based on an elected master coordinator mechanism. In an alternative embodiment, the distributed database technique is based on a distributed coordination mechanism.

The distributed database keeps track of each PVR's time slot availability, disk space availability and network bandwidth availability. Based on this shared database information, one PVR device's recording task can be delegated to another device. For example, the recording task of the first PVR 302 can be delegated to the second PVR 304. The remotely recorded contents may be transferred simultaneously to the television 110 or to a remote television. In an alternative embodiment, the remotely recorded contents may be batch processed and transferred non-realtime to the television 110. In yet another alternative embodiment, the remotely recorded contents may be maintained in storage and later transferred to a remote television.

Figure 5:
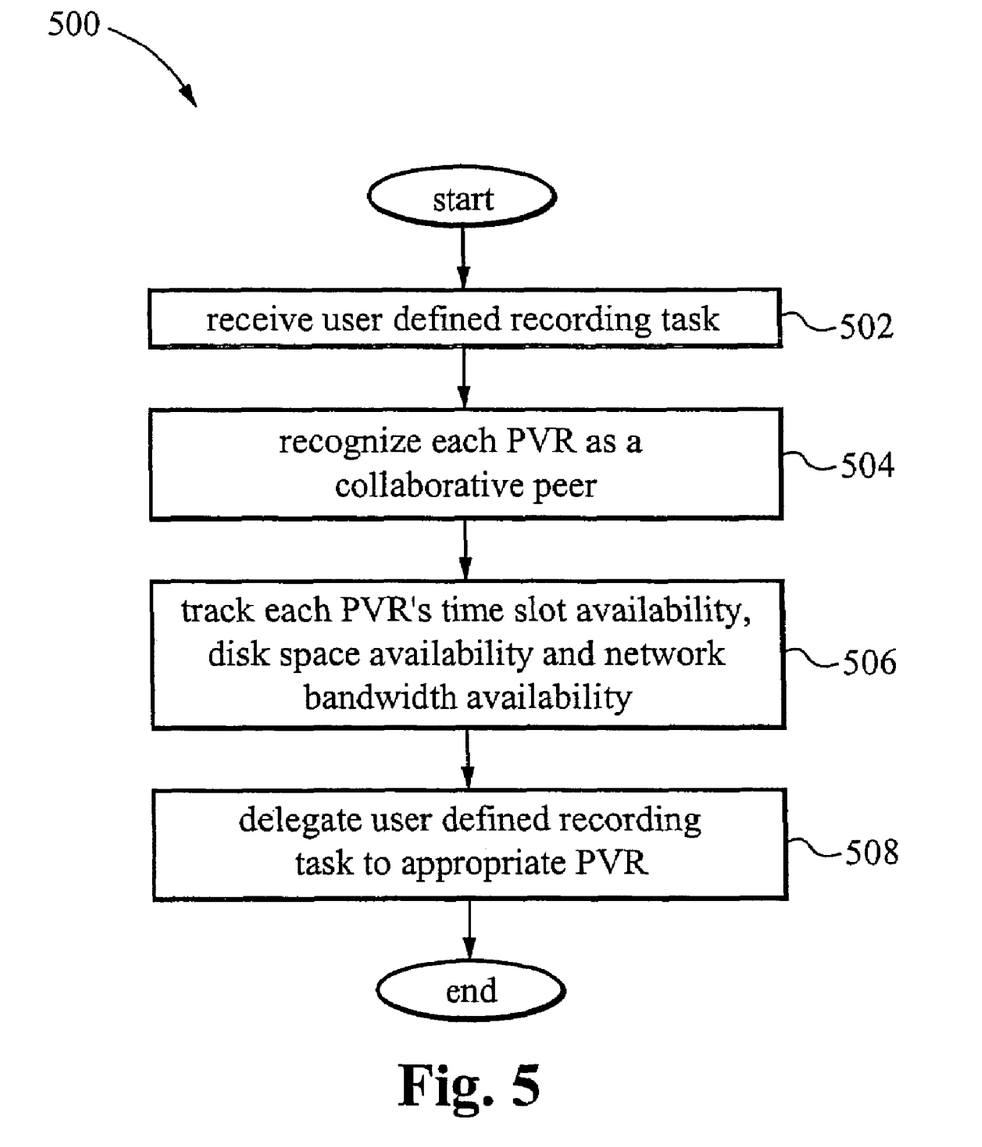
FIG. 5 illustrates a flowchart of a method of implementing a PVR system.

FIG. 5 illustrates a flowchart of a method of implementing a PVR system. As an example, if the first PVR 402 is already scheduled to record World News at 3:30 pm on channel 386, and the user wants to schedule a recording of Oprah Winfrey at 3:00 pm on channel 87. The first PVR 402 receives this user defined recording task in the step 502. The user inputs this recording task through a PVR menu displayed on the television 110. Behind the scene and invisible to the user, in the step 504, the PVR system recognizes each PVR in the network as a collaborative peer. A distributed database handles statistical information about each PVR device. As discussed above, the distributed database is based on either an elected master coordinator or a distributed coordination mechanism.

In the step 506, the distributed database keeps track of each PVR's time slot availability, disk space availability and network bandwidth availability. Then, in the step 508, the PVR system delegates the user defined recording task to the appropriate PVR. For example, the PVR system determines that the first PVR 402 is unavailable to record Oprah Winfrey at 3:00 pm because of the conflict with World News scheduled to be recorded at 3:30 pm. Based on the shared database information in the distributed database, the first PVR's recording tasks are delegated to another PVR, such as the second PVR 404. The method is then completed.

Figure 6:
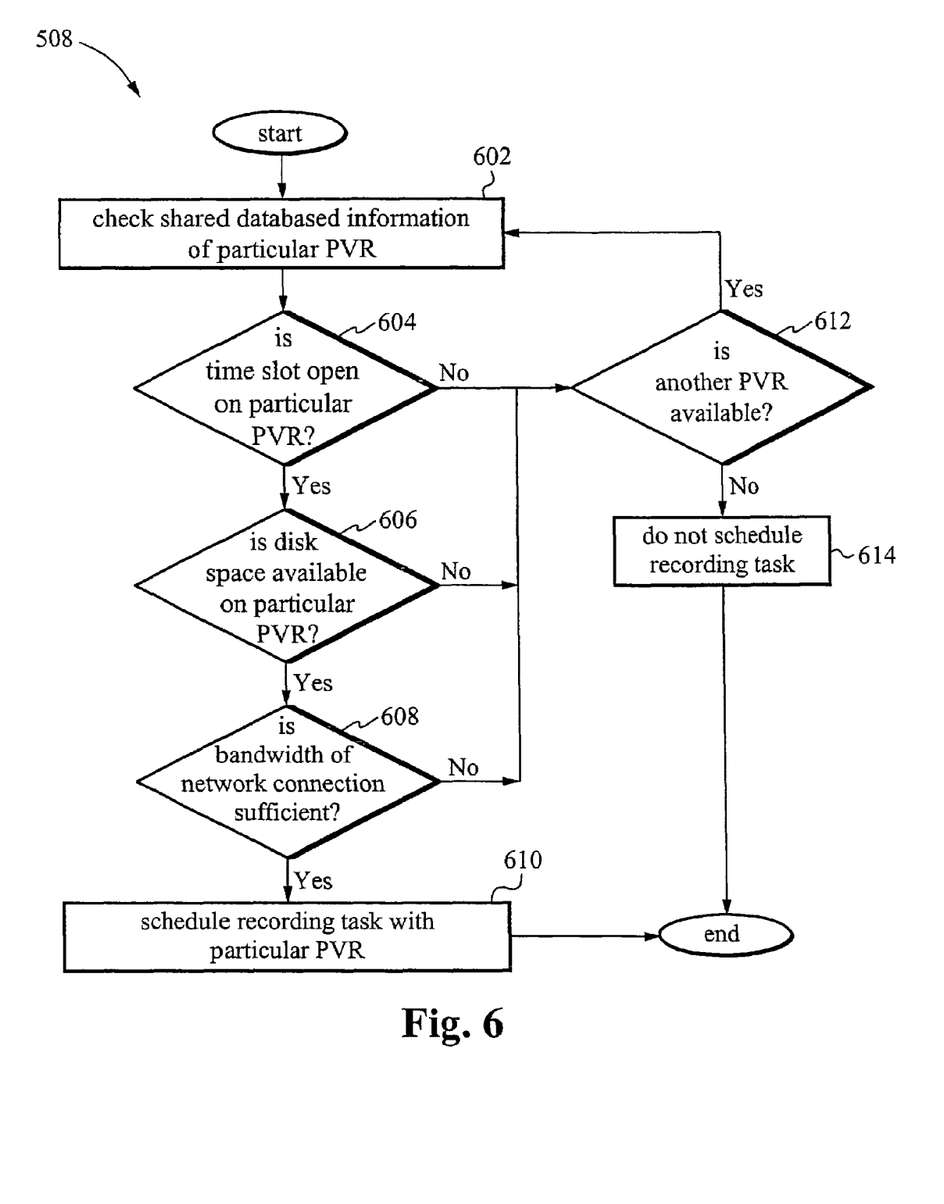
FIG. 6 illustrates a flowchart of step 508 of FIG. 5, which involves delegating a user defined recording task.

FIG. 6 illustrates a flowchart of the step 508 of FIG. 5, which involves delegating a user defined recording task. In the step 602, the PVR system checks shared database information of a particular PVR. This checking leads into the following decision operations. In the decision operation 604, the PVR system determines whether the particular PVR is open for the user selected time slot. For example, the PVR system checks whether the second PVR 404 is open for a recording of Oprah Winfrey at 3:00 pm. In other words, the PVR system determines whether the request conflicts with any other scheduled recording task on the particular PVR being checked. If the time slot is not open, the method proceeds to the decision operation 612, where the PVR system determines whether another PVR is available.

However, if the time slot is open, the method moves to the decision operation 606, where the PVR system determines whether the current PVR being checked has sufficient disk space. If the particular PVR does not have sufficient disk space, the method proceeds to the decision operation 612, where the PVR system determines whether another PVR is available.

However, if the particular PVR does have sufficient disk space, the method proceeds to the decision operation 608, where the PVR system determines whether the bandwidth of the network connection to the particular PVR is sufficient. If the bandwidth is not sufficient, the method proceeds to the decision operation 612, where the PVR system determines whether another PVR is available.

If another PVR device is not available, the PVR system does not schedule a recording task in the step 614, and the method is completed. If, however, another PVR device is available, the method of delegating returns to the step 602 and proceeds with checking operations on the next PVR device.

If it is determined that the bandwidth is sufficient in the decision operation 608, the method moves to the step 610, where the PVR system schedules the user defined recording task with the particular PVR being checked. The method is then completed.

In an alternative embodiment to the flowchart of FIG. 6, statistical information of a particular PVR device is compared to statistical information of other PVR devices in the PVR network. Based on the comparison, the PVR system schedules the recording task with the most likely suitable PVR device. For each PVR, the PVR system keeps track of time slot availability, disk space availability, and bandwidth of network connection for each PVR in the distributed database. As an example, assume the first PVR 302 and the second PVR 304 are both available for a particular recording task; both have sufficient disk space; the first PVR 302 has a bandwidth of 56 Mbps; and the second PVR 304 has a bandwidth of 100 Mbps. In this example, both PVR devices could record the program, and both have sufficient disk space. So the PVR system would make a comparison as to which PVR has better bandwidth. Here, the second PVR 304 has better bandwidth. The PVR system will select the second PVR 304 as the most likely suitable PVR device for the recording task. In another example, the PVR system may select a suitable PVR based on available disk space or other statistical information not explicitly mentioned here.

Advantageously, the networked PVR system maximizes the recording resources amongst networked PVR devices. The networked PVR system is configured to distribute the resource usage information, including time slot availability, disk space availability and bandwidth availability, amongst the networked PVR devices. The networked PVR system thereby maximizes recording capabilities as a whole system rather than as piecemeal amongst individual devices. Accordingly, capabilities of the networked PVR system exceed the sum of individual PVR capabilities.

Practical Implementation of the PVR System

Portions of the networked PVR system may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical disks, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including but not limited to receiving a user defined recording task, recognize each personal video recorder in the network as a collaborative peer, tracking statistical information on each personal video recorder, and delegating an appropriate personal video recorder to record the user defined recording task, according to processes of the present invention.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of managing personal video recorders in a network, the method comprising:
   receiving a user defined recording task;
   recognizing each personal video recorder in the network as a collaborative peer;
   tracking statistical information on each personal video recorder, wherein the tracking of the statistical information comprises tracking statistical information using a distributed database, wherein the distributed database is based on at least one of:
   an elected master coordinator; and
   a distributed coordination system; and
   delegating an appropriate personal video recorder within the network to record the user defined recording task.

2. The method of claim 1, wherein for each personal video recorder, the distributed database keeps track of at least one of:
   time slot availability;
   disk space availability; and
   network bandwidth availability.

3. The method of claim 1, wherein the distributed database is a shared distributed database locally stored on each personal video recorder.

4. The method of claim 1, wherein the delegating an appropriate personal video recorder within the network to record the user defined recording task comprises at least one of:
- checking statistical information of a particular personal video recorder;
- determining whether the particular personal video recorder has an open time slot during the user defined recording task;
- determining whether the particular personal video recorder has sufficient disk space; and
- determining whether the particular personal video recorder has a network connection with sufficient bandwidth.

5. The method of claim 4, wherein the delegating an appropriate personal video recorder within the network to record the user defined recording task further comprises at least one of:
- determining that the particular personal video recorder does not have an open time slot during the user defined recording task;
- determining that the particular personal video recorder does not have sufficient disk space;
- determining that the particular personal video recorder does not have a network connection with sufficient bandwidth; and
- deciding not to schedule the user defined recording task with the particular personal video recorder.

6. The method of claim 4, wherein the delegating an appropriate personal video recorder within the network to record the user defined recording task further comprises at least one of:
- determining that the particular personal video recorder has an open time slot during the user defined recording task;
- determining that the particular personal video recorder has sufficient disk space;
- determining that the particular personal video recorder has a network connection with sufficient bandwidth; and
- scheduling the user defined recording task with the particular personal video recorder.

7. A system for managing personal video recorders over a network, the system comprising:
- a first personal video recorder connected to the network;
- a second personal video recorder connected to the network; and
- a distributed database configured to track statistical information on the first personal video recorder and on the second personal video recorder,
- wherein for each personal video recorder in the network, the distributed database keeps track of at least one of:
  - time slot availability;
  - disk space availability; and
  - network bandwidth availability.

8. The system of claim 7, wherein the distributed database is based on at least one of:
- an elected master coordinator; and
- a distributed coordination system.

9. The system of claim 7, wherein the distributed database is a shared distributed database locally stored on each personal video recorder.

10. A personal video recorder configured to have a connection to another personal video recorder over a network, the personal video recorder comprising a shared distributed database configured to track statistical information on the personal video recorder and the other personal video recorder, wherein the distributed database is a shared distributed database locally stored on each personal video recorder.

11. The personal video recorder of claim 10, wherein the distributed database is based on at least one of:
- an elected master coordinator; and
- a distributed coordination system.

12. The system of claim 10, wherein for each personal video recorder, the distributed database keeps track of at least one of:
- time slot availability;
- disk space availability; and
- network bandwidth availability.

13. A virtual personal video recorder implemented on a computing device configured to have a connection to a network including a plurality of personal video recorders, the virtual personal video recorder comprising a personal video recorder menu, wherein the personal video recorder menu is an integrated interface to resources of at least two personal video recorders in the network, wherein the virtual personal video recorder comprises at least one of software and hardware.

14. The virtual personal video recorder of claim 13, further comprising a connection to a distributed database, wherein the distributed database is configured to track the resources of the at least two personal video recorders in the network.

15. The virtual personal video recorder of claim 13, wherein the virtual personal video recorder is a standalone device loaded with software configured to receive information from a first personal video recorder and a second personal video recorder.

16. The virtual personal video recorder of claim 15, wherein the software includes an instruction set for performing processing on the information received from the first personal video recorder and from the second personal video recorder.

17. The virtual personal video recorder of claim 13, wherein the personal video recorder menu allows a user to interact with and manipulate features of the plurality of personal video recorders.

* * * * *